Sept. 28, 1948.   T. J. HALL   2,450,336
ELECTRICAL COUPLING DEVICE PARTICULARLY
FOR ELECTRIC HEATING APPLIANCE STANDS
Filed Feb. 4, 1946
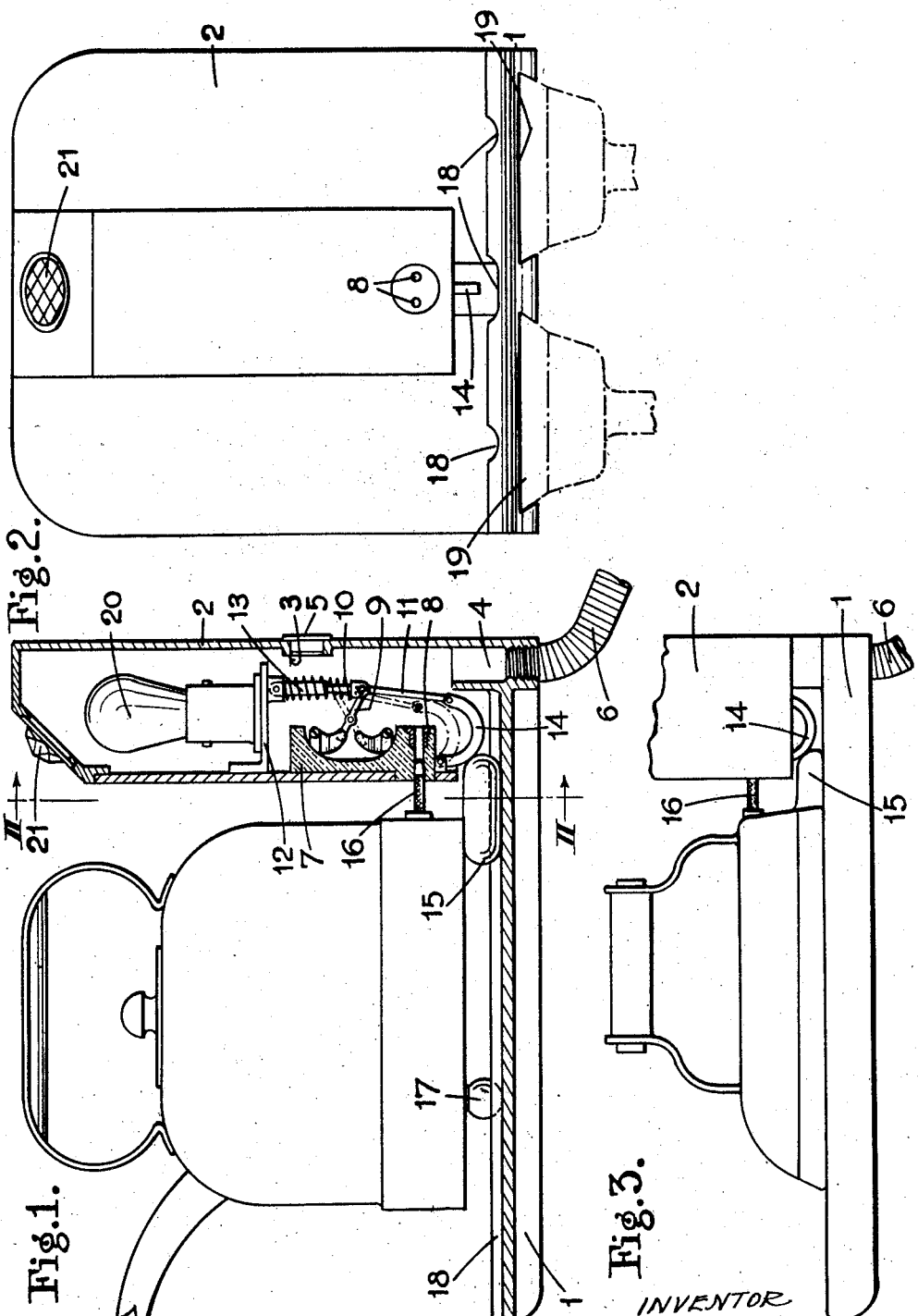
INVENTOR
THOMAS J. HALL
By Emory L. Groff Atty Patented Sept. 28, 1948

2,450,336

UNITED STATES PATENT OFFICE 2,450,336

ELECTRICAL COUPLING DEVICE PARTICULARLY FOR ELECTRIC HEATING APPLIANCE STANDS

Thomas John Hall, Betchworth, England

Application February 4, 1946, Serial No. 645,437
In Great Britain November 7, 1945

4 Claims. (Cl. 219—43)

1

This invention relates to electric coupling appliances for supplying electric kettles, electric irons and like portable appliances which require to be temporarily connected to supply mains from time to time and which are commonly provided with flexible supply conductors attached to a plug connector for insertion into a wall socket or the like.

The flexible conductors commonly used for supplying the current to portable appliances, particularly for domestic use, are a source of considerable inconvenience and of some danger, owing to the fact that the flexible conductors quickly deteriorate in use and the ordinary user usually fails to notice the deterioration of the flexible conductor, or at any rate neglects to remedy it, until a definite fault resulting in breakdown or accident occurs.

The present invention provides a new or improved coupling device which dispenses with the usual flexible supply conductors and enables the appliance to be connected to and disconnected from the supply mains with complete safety. The invention consists in the combination of a shelf or support for an electric kettle or other appliance to be connected to the mains, a socket connector mounted on the shelf or in fixed relation thereto and adapted to cooperate with a plug connector on the appliance arranged so that the pins of the plug connector can be inserted into the socket elements of the socket connector by a sliding movement of the appliance upon the shelf or other support, and a switch device controlling the supply of current to the socket connector and adapted to be operated by the engagement of a switch operating member with a projection provided on the appliance and arranged so that the action of pushing the plug connector on the appliance into the socket member turns on the switch whilst the action of withdrawing the plug connector turns off the switch. The said shelf is made of metal or is provided with a metallic surface arranged to make contact with a metal part of the appliance when the latter is placed on the shelf or support to provide a protective earth connection therefor.

The invention will now be described with reference to the accompanying drawings which show one example of an apparatus according to the invention and in which:

Figure 1 is a longitudinal sectional view of the appliance and shows an electric kettle standing thereon, Figure 2 is a transverse section on the line 2—2 of Figure 1 and

2

Figure 3 is a side elevation partly broken away and shows an electric iron in the place of the kettle shown in Figure 1.

The device shown in the drawing comprises a shelf 1 of generally rectangular shape and a casing or housing 2 mounted on the shelf so as to project upwards from the rear end thereof and leaving sufficient room to enable a kettle, electric iron or similar appliance to be stood upon the shelf in front of the casing 2.

As shown in the drawing, the shelf 1 is made wholly of metal and this construction is preferred but, if desired, the shelf may be of composite construction providing a metallic surface to make contact with a metallic part of the appliance to be stood thereon so as to provide a protective metallic continuity to earth as will hereinafter be further explained. The casing 2 is also preferably made entirely of metal, but it would be possible to use other materials if preferred.

The shelf 1 may be fixed to a wall or other support. If desired it may be attached to a cooker so as to project, for example, from the side thereof. In order to facilitate the mounting of the shelf in a desired position, the casing 2 may be provided with a cable entry opening 3 in the rear wall thereof and a cable entry opening 4 at the bottom thereof, suitable removable closures such as that shown at 5 being provided for closing the cable entry opening if required. This enables the main supply to be introduced either through the rear wall of the casing 2 or through the bottom of the device as may be most convenient and, when the device is fixed to the side of a cooker, it may conveniently be supplied with current through a flexible metallic conduit such as that indicated at 6 in Figure 1. One end of this conduit may be secured as for example by screwing into the cable entry opening 4 whilst the other end is attached to some part of the conduit system containing the power supply conductors to the cooker.

Mounted in the casing 2 on the front wall thereof is a combined two-pin socket connector and double-pole tumbler switch mounted on a porcelain or other insulating body 7 and arranged to be wired so that in one position of the switch the socket terminal connectors 8 are connected to the mains whilst in the other position of the switch both socket terminal connectors 8 are isolated from the mains.

The operating lever 9 of the tumbler switch is pivotally connected to a pair of toggle links 10 and 11. The link 10 is of telescopic construction and is pivotally connected at one end to the lever 9 and at the other end to a bracket 12 fixed to the front wall of the casing 2 above the switch, a coiled spring 13 being arranged so that it tends to lengthen the telescopic link 10 and to rock the lever 9 downward as seen in the drawing so as to open the switch. The link 11 is pivotally connected at one end to the lever 9 and at the other end to a switch operating lever 14 which is pivotally attached to the front wall of the casing 2 and projects rearwardly therefrom beneath the switch.

The operating lever 14 is shaped so that it forms a cam surface adapted to cooperate with a metal foot or projection 15 fixed to the base of an appliance such as the electric kettle shown in Figure 1. The front wall of the casing is provided with an opening to receive the feet or projection 15 and the arrangement is such that, when this foot or projection is pushed through the said opening into the interior of the casing 2, the lever 14 is rocked in an upward direction against the spring 13 and moves the switch to the closed position.

Any number of kettles, electric irons or other appliances may be provided for use with the device and each such appliance is provided with a plug connector comprising terminal pins, one of which is shown at 16 in Figure 1, mounted near the base of the appliance in such a way that, when the appliance is stood on the shelf 1, the pins 16 can be made to enter the socket connectors 8 by sliding the appliance on the self 1 towards the casing 2. Each appliance is also provided with a foot or projection 15 as hereinbefore mentioned and this foot or projection is arranged in relation to the pins 16 so that, as the appliance is pushed in a rearward direction to cause the pin 16 to enter the socket connectors 8, the foot or projection 15 operates the lever 14 so that the switch is moved to the closed position against the action of the spring 13.

Each electric kettle provided for use with the device is preferably provided with three feet by which it can be stood upon a table or other surface. Two of these feet may be of metal or other material and one of these two feet can be seen at 17 in Figure 1 of the drawing. The third foot is formed by the foot or projection 15 previously referred to and, as previously indicated, is arranged in relation to the pin 16 so that it will operate the lever 14 when the pins are inserted into the socket member.

In order to facilitate the proper insertion of the pin 16 on the kettle into the socket terminals 8, the shelf 1 is provided with three grooves 18 (see particularly Figure 2 of the drawings) which extend in a fore-and-aft direction from end to end of the shelf 1 and which are arranged to receive the feet 15 and 17 of the kettle and to guide the same when it is pushed rearwardly on the shelf so as to bring the pin 16 into engagement with the socket terminals 8.

The foot 15 is made of metal and is in metallic continuity with the body of the kettle so that the body of the kettle is electrically connected to the shelf 1 (or to the metallic surface provided thereon as hereinbefore mentioned) when the kettle is placed on the shelf. It is thus impossible to break the continuity between the body of the kettle and the shelf 1 or the metallic surface provided thereon until the switch controlled by the lever 14 has been moved to the off position and the pins 16 have been withdrawn from the socket connectors. The shelf 1, or the above mentioned metal surface thereon, is of course to be permanently connected to earth in any approved manner.

Electric irons or other appliances provided for use with the device will also be provided with pins 16 adapted to enter the socket connectors 8 by a sliding movement of the appliance upon the shelf 1 and also with a foot or projection 15 arranged to operate the lever 14 as hereinbefore described and provision is made in each case to ensure electric continuity between the body of the appliance and the shelf 1 or metallic surface provided thereon. Figure 3 shows an electric iron stood on the table 1, electric continuity between the iron and the shelf 1 or metal surface provided thereon being ensured both by the contact of the flat bottom of the iron with the shelf or the metallic surface thereon and also by the engagement of the foot or projection 15 between the lever 14 and the shelf 1.

As illustrated in Figure 2, the under-surface of the shelf 1 is provided with a number of grooves 19 adapted to receive a number of irons so that the latter can be conveniently stored under the shelf by pushing them into the grooves 19 as shown in Figure 2 so that they will be suspended therefrom.

In order to avoid any possible danger of shock or damage due to contact of a foreign body with the pins 16 when in connection to the mains, these pins may be insulated over about half their length so that when the pins are partially engaged with the socket connector, for example as illustrated in Figure 1, only insulated parts of the pins project in front of the wall of the casing 2. The socket connectors 8 are made of such length and are so arranged that contact between the bare parts of the pin 16 and the socket connectors 8 cannot occur until the bare parts of the pins 16 have disappeared entirely into the insulating body 7. All danger of shock or damage due to portions of the pin 16 projecting in front of the casing 2 whilst the pins are still live is thus avoided.

The part shown at 20 in Figure 1 is a pilot lamp mounted in the casing 2 on the bracket 12 and connected to the socket terminals 8 so as to be lighted when the current is switched on to the socket terminals 8. A window 21 is provided on the front of the casing 2 so as to enable the light of the pilot lamp to be seen and it will be evident that this arrangement provides a convenient indication to the user that the current is switched on.

I claim:

1. An electric coupling device for connecting an electric heating appliance such as a kettle to the electric mains, comprising the combination of a support having a housing upstanding from the rear end thereof, a socket connector comprising an insulated body mounted within the housing and having sockets opening in the front wall and located above an entrance aperture into said housing, socket terminals mounted in and inset from the mouth of the sockets, a complementary plug connector having terminals projecting from said appliance, a grooved guide extending from front to rear of said support towards the front wall of the housing for slidable engagement with the appliance to guide the plug terminals into the sockets, a guard shroud on one of said connectors which covers the plug terminals and electrically insulates them from external connection during engagement with or disengagement from the socket terminals, a projection on the appliance arranged to pass through the apertured entrance in the housing as the plug terminals move into the sockets and an electric switch device in said housing and having a spring returned operating member so disposed in relation to the apertured entrance in the housing that it is moved by the projection to close the switch during the engaging movement of the plug terminals into the socket terminals.

2. An electric coupling device according to claim 1, wherein the projection on the appliance for operating the switch operating member is constituted as feet to the appliance which slidably engage in the grooved guide in the support.

3. An electric coupling device according to claim 1, wherein the underside of the support opposite to that side which contains the grooved guide is provided with a grooved support formed to receive and hold the base of an electric iron in inverted position.

4. An electric coupling device for connecting an electric heating appliance such as a kettle to the electric mains, comprising the combination of a support having a housing upstanding from the rear end thereof, means for earthing the appliance during connection to the mains including a projection on the appliance and a grooved guide on the support in which the projection is slidable, a socket connector with two mains socket terminals mounted on the front wall of said housing, a complementary plug connector having terminals projecting from said appliance, an electric switch device in said housing and having a spring returned operating member located adjacent to an aperture in the front wall of said housing, the said guide, projection, connectors and operating member being arranged so that the plug terminals are guided into engagement with the socket terminals by the projection engaging in the guide and the projection passes through the aperture to move the operating member to close the switch while a positive earth connection is maintained throughout electrical connection of the connectors, and a guard shroud on the plug connector which protects and electrically insulates the bare parts of the plug terminals from external connection while the said plug terminals are engaged with the socket terminals.

THOMAS JOHN HALL.

REFERENCES CITED

The following references are of record in the file of this patent:

UNITED STATES PATENTS

| Number | Name | Date |
|---|---|---|
| 1,421,850 | Shirk et al. | July 4, 1922 |
| 1,994,877 | Shoop et al. | Mar. 19, 1935 |
| 2,020,110 | Duvall | Nov. 5, 1935 |
| 2,054,714 | Reich | Sept. 15, 1936 |
| 2,148,083 | Nilson | Feb. 21, 1939 |
| 2,278,994 | Kempton | Apr. 7, 1942 |
| 2,293,764 | Roeder | Aug. 25, 1942 |